(12) United States Patent
Eriksson et al.

(10) Patent No.: US 10,111,252 B2
(45) Date of Patent: Oct. 23, 2018

(54) METHODS AND DEVICES FOR RANDOM ACCESS PREAMBLE SHIFTING

(71) Applicant: TELEFONAKTIEBOLAGET LM ERICSSON (PUBL), Stockholm (SE)

(72) Inventors: Erik Eriksson, Linköping (SE);
Fredrik Gunnarsson, Linköping (SE);
Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 15/117,700

(22) PCT Filed: Feb. 10, 2015

(86) PCT No.: PCT/SE2015/050150
§ 371 (c)(1),
(2) Date: Aug. 9, 2016

(87) PCT Pub. No.: WO2015/119568
PCT Pub. Date: Aug. 13, 2015

(65) Prior Publication Data
US 2016/0366703 A1      Dec. 15, 2016

Related U.S. Application Data

(60) Provisional application No. 61/937,991, filed on Feb. 10, 2014.

(51) Int. Cl.
*H04W 74/08* (2009.01)
*H04W 56/00* (2009.01)
(Continued)

(52) U.S. Cl.
CPC ..... *H04W 74/0833* (2013.01); *H04J 13/0062* (2013.01); *H04L 47/29* (2013.01);
(Continued)

(58) Field of Classification Search
None
See application file for complete search history.

(56) References Cited

U.S. PATENT DOCUMENTS 7,308,055 B2 * 12/2007 Okamoto ............ H04L 25/0228
375/346
2007/0087760 A1 * 4/2007 Ogino ....................... G01S 5/06
455/456.1

(Continued)

FOREIGN PATENT DOCUMENTS

EP          2487971 A1      8/2012
WO       2012106798 A1    8/2012

OTHER PUBLICATIONS

Sony, "RACH access failure problems: "aggressive RACH" and "Chiba" issues," R2-133159, 3GPP TSG-RAN WG2 Meeting #83bis, Ljubliana, Slovenia, Oct. 7-11, 2013, 4 pages.

(Continued)

*Primary Examiner* — Bunjob Jaroenchonwanit
(74) *Attorney, Agent, or Firm* — Sage Patent Group

(57) ABSTRACT

A method implemented in a user equipment (UE) for adjusting for propagation delay includes transmitting one or more preamble sequence sequences to a network node. The method further includes recording a response result for each preamble sequence transmitted to the network node. The method includes analyzing each response result to determine whether a propagation delay condition exists. If the propagation delay condition exists, the method includes adjusting a timing of a preamble sequence transmission in accordance with a time shift or monitoring for a preamble sequence in accordance with the time shift.

24 Claims, 22 Drawing Sheets

(51) Int. Cl.
*H04J 13/00* (2011.01)
*H04L 12/801* (2013.01)
*H04W 88/02* (2009.01)
*H04W 88/08* (2009.01)

(52) U.S. Cl.
CPC ....... *H04W 56/00* (2013.01); *H04W 56/0005* (2013.01); *H04W 88/02* (2013.01); *H04W 88/08* (2013.01)

(56) References Cited

U.S. PATENT DOCUMENTS

| | | | |
|---|---|---|---|
| 2008/0019454 A1* | 1/2008 | Lai | H04L 27/266 375/260 |
| 2010/0210255 A1 | 8/2010 | Amirijoo et al. | |
| 2011/0281610 A1* | 11/2011 | Abreu | H04B 7/0404 455/517 |
| 2011/0310857 A1 | 12/2011 | Vujic | |
| 2012/0003995 A1* | 1/2012 | Ishii | G01S 5/021 455/456.1 |
| 2012/0044897 A1* | 2/2012 | Wager | H04L 1/0039 370/329 |
| 2012/0082088 A1* | 4/2012 | Dalsgaard | H04L 12/4625 370/315 |
| 2013/0083747 A1* | 4/2013 | Narasimha | H04W 74/0841 370/329 |
| 2013/0155894 A1* | 6/2013 | Li | H04W 74/0833 370/252 |
| 2013/0242735 A1* | 9/2013 | Koc | H04W 72/0413 370/232 |
| 2014/0161117 A1* | 6/2014 | Sebire | H04W 56/0005 370/350 |
| 2014/0241285 A1* | 8/2014 | Pang | H04W 74/0833 370/329 |
| 2016/0029336 A1* | 1/2016 | Aldana | H04W 56/003 370/350 |

OTHER PUBLICATIONS

Ericsson, "Solving Chiba issue in E-UTRAN," R2-140621, 3GPP TSG-RAN WG2 #85, Prague, Czech Republic, Feb. 10-14, 2014, 5 pages.

Supplementary Partial European Search Report issued in European Application No. 15746844.8, dated Dec. 21, 2016, 9 pages.

International Search Report and Written Opinion dated Jun. 9, 2015, in International Application No. PCT/SE2015/050150, 11 pages.

López-Martínez et al. "Digital Signal Processing", Science Direct, Dpto. Ingenieria de Comunicaciones, Málaga, Spain, (20120124), XP029094388 [A] ; abstract; Section 4.2, DOI: http://dx.doi.org/10.1016/j.jprot.2014.07.029, 9 pages.

NEC Corporation "Consideration on Chiba issue" 3GPP TSG-RAN2 Meeting #83, R2-132661, 2013, 2 pages.

Huawei et al. "Avoid reselecting back to "CHIBA" cell" 3GPP TSG-RAN2 WG2 Meeting #83, R2-132738, 2013, 3 pages.

NEC Corporation "Consideration on Chiba issue" 3GPP TSG-RAN2 Meeting #83b, R2-133422, 2013, 3 pages.

3GPP, 3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.0.0, 2013, 57 pages.

3GPP, 3rd Generation Partnership Project; Technical Specification Group Radio Access Network; Evolved Universal Terrestrial Radio Access (E-UTRA); Physical channels and modulation (Release 12), 3GPP TS 36.211 V12.0.0, 2013, 120 pages.

NTT Docomo, Inc. "RACH transmission failure issue" 3GPP TSG-RAN WG2 Meeting #83bis, R2-133405, 2013, 11 pages.

* cited by examiner

```
UEInformationResponse-r9-IEs ::=    SEQUENCE {
    rach-Report-r9                      SEQUENCE {
        numberOfPreamblesSent-r9            NumberOfPreamblesSent-r11,
        contentionDetected-r9               BOOLEAN
    }                                                               OPTIONAL,
    rlf-Report-r9                       RLF-Report-r9               OPTIONAL,
    nonCriticalExtension                UEInformationResponse-v930-IEs  OPTIONAL
}
```

FIG. 2

```
ConnEstFailReport-r11 ::=    SEQUENCE{
    failedCellId-r11         CellGlobalIdEUTRA,
    locationInfo-r10         LocationInfo-r10                      OPTIONAL,
    measResultFailedCell-r11 SEQUENCE{
        rsrpResult-r11           RSRP-Range,
        rsrqResult-r11           RSRQ-Range                        OPTIONAL
    },
    measResultNeighCells-r11 SEQUENCE{
        measResultListEUTRA-r11     MeasResultList2EUTRA-r9       OPTIONAL,
        measResultListUTRA-r11      MeasResultList2UTRA-r9        OPTIONAL,
        measResultListGERAN-r11     MeasResultListGERAN           OPTIONAL,
        measResultsCDMA2000-r11     MeasResultList2CDMA2000-r9    OPTIONAL
    } OPTIONAL,
    numberOfPreamblesSent-r11   NumberOfPreamblesSent-r11,
    contentionDetected-r11      BOOLEAN,
    maxTxPowerReached-r11       BOOLEAN,
    timeSinceFailure-r11        TimeSinceFailure-r11,
    measResultListEUTRA-v1130   MeasResultList2EUTRA-v9e0         OPTIONAL,
    ...
}
```

FIG. 3

```
UEInformationResponse-r9-IEs ::=    SEQUENCE {
    rach-Report-r9                      SEQUENCE {
        numberOfPreamblesSent-r9            NumberOfPreamblesSent-r11,
        contentionDetected-r9               BOOLEAN
        excessiveDelayDetected-rX           BOOLEAN
    }                                                           OPTIONAL,
    rlf-Report-r9                       RLF-Report-r9           OPTIONAL,
    nonCriticalExtension                UEInformationResponse-v930-IEs  OPTIONAL
}
```

FIG. 12

```
UEInformationResponse-r9-IEs ::= SEQUENCE {
    rach-Report-r9                  SEQUENCE{
        numberOfPreamblesSent-r9        NumberOfPreamblesSent-r11,
        contentionDetected-r9           BOOLEAN
        excessiveDelay-rX               PreambleIndexOffset-rX
                                                            OPTIONAL,
    }                                                       OPTIONAL,
    rlf-Report-r9                   RLF-Report-r9           OPTIONAL
    nonCriticalExtension            UEInformationResponse-v930-IEs  OPTIONAL
}
```

FIG. 13

```
UEInformationResponse-r9-IEs ::= SEQUENCE{
    rach-Report-r9              SEQUENCE{
        numberOfPreamblesSent-r9    NumberOfPreamblesSent-r11,
        contentionDetected-r9       BOOLEAN
        excessiveDelay-rX           timeShift-rX
                                                        OPTIONAL,
                                                        OPTIONAL,
    }
    rlf-Report-r9               RLF-Report-r9
    nonCriticalExtension        UEInformationResponse-v930-IEs   OPTIONAL
}
```

FIG. 14

```
UEInformationResponse-r9-IEs ::= SEQUENCE {
    rach-Report-r9              SEQUENCE {
        numberOfPreamblesSent-r9    NumberOfPreamblesSent-r11,
        contentionDetected-r9       BOOLEAN
        timeAlignmentIncrement-rX   TimingAdvanceCommand-rX
                                                            OPTIONAL,
    }                                                       OPTIONAL,
    rlf-Report-r9               RLF-Report-r9
    nonCriticalExtension        UEInformationResponse-v930-IEs  OPTIONAL
}
```

FIG. 15

METHODS AND DEVICES FOR RANDOM ACCESS PREAMBLE SHIFTING

CROSS REFERENCE TO RELATED APPLICATION(S)

This application is a 35 U.S.C. § 371 National Phase Entry Application from PCT/SE2015/050150, filed Feb. 10, 2015, designating the United States, and also claims the benefit of U.S. Provisional Application No. 61/937,991, filed Feb. 10, 2014. The disclosures of both applications are incorporated herein in their entirety by reference.

TECHNICAL FIELD

This disclosure relates generally to methods and devices for random access preamble shifting.

BACKGROUND

A propagation distance issue arises in special deployments where a UE is camped on a faraway cell. The signal strength to the cell is good due special characteristics of the deployment (e.g., sea-reflected signal or certain antenna tilt), but the UL preamble cannot be received correctly by the eNB due to long propagation delay. On the other hand, aggressive RACH issue occurs more in the scenario where the path loss to the cell is low or interference high resulting unsuccessful RACH attempts. These attempts are continued over many seconds as long as a corresponding timer (T300, T310 etc.) expires.

Even though both the propagation distance and Aggressive RACH issues result in excessive load and interference due to repeated random access attempts, these issues are separate and require different solutions. The RAN2 should introduce a solution to the propagation distance issue. However, views on the solutions vary from the UE centric to network centric solution.

As discussed above, the propagation distance issue relates to the scenario where the UE is camped on the cell that is far away. In this case, both UL and DL signal strength can be good. However, because the propagation delay is long, the eNB cannot detect the preamble correctly as the preamble arrives outside the suitable time window. In this regard, in this scenario, an "aliasing problem" can occur where the eNB interprets the preamble incorrectly as a different one as compared to the preamble sent by the UE.

The aliasing problem occurs due to how the preamble sequences are generated. According to 3GPP TS 36.211, multiple random access preambles are generated from one or several Zadoff-Chu sequences. The set of 64 preamble sequences in a cell is found by including the available cyclic shifts from each Zadoff-Chu sequence and adding more Zadoff-Chu sequences as needed. The number of cyclic shifts in a Zadoff-Chu sequence depends on $N_{cs}$ given by the zero correlation zone configuration and whether unrestricted or restricted sets of cyclic shifts are used.

FIG. 1 shows the detected delay in a PRACH receiver after matched filtering with the root Zadoff-Chu sequence, for unrestricted sets of cyclic shifts and $N_{cs}>0$. If the round trip delay is larger than $N_{cs}$, the detected delay falls into another preamble sequence. For example, FIG. 1 illustrates that preamble sequence 0 is transmitted, but due to aliasing, this preamble sequence is detected as preamble sequence $[N_{zc}/N_{cs}]-1$. The eNB sends a random access response, however, the UE will not respond with message 3 since the preamble identifier is wrong.

The random access procedure is described in [3GPP TS 36.321]. Briefly, after initialization and resource selection, the UE transmits a preamble on the selected resource. The UE then monitors PDCCH for a Random Access Response (RAR) with a certain RA-RNTI in the RA Response window. If no RAR is received within the RA Response window, or if none of the RARs contain a preamble identifier corresponding to the one transmitted by the UE, the RAR reception is not successful and the UE repeats the preamble transmission until a maximum number of transmissions is reached.

The propagation distance issue can be solved to some extent by existing means. First solution is to apply proper network planning in such a way that the problematic scenarios are avoided. This can be done by tilting antennas, etc. However, this solution is not always a cost effective solution as the cell size may be reduced unnecessarily for the areas where the problem does not occur.

Another solution is to change the PRACH preamble format to and extended format (e.g., preamble format 1 and 3) and zero correlation zone configuration. If this is done, then aliasing problems should be solved in most of the deployments. However, this solution may not be used on all networks and cells as this comes with the cost of radio resources. To conclude, there are existing solutions, but it is not always easy to know when those solutions should be used.

In RAN2, new solution directions have also been proposed. These solutions can be divided to the UE based solutions and network based solutions. A UE based solution can be considered to be a real-time solution whereas a network based solutions is a non-real time solution.

In the UE based solutions, the UE solves the problem situation when the UE cannot connect to the best cell.

In a first solution:
propagation distance issue is addressed in UTRAN and EUTRAN by applying an offset in dB to the current/failed cell in cell selection/reselection criteria.
The offset is applied in UTRAN and EUTRAN when UE detects connection establishment failure one or more times in RRC—number of times is configured by NW.
Offset is cleared upon cell reselection, either to a 3rd cell or to the original cell (using offset) for both UTRAN and EUTRAN. Alternatively, the offset is removed after expiry of a timer.

In a second solution, when the propagation distance issue is detected by the UE, the cell is barred instead of using an offset. Additionally it has been proposed that the offset is scaled depending on certain conditions.

Additionally, in a solution where the UE detects the propagation distance problem based on the failed RAR messages occurs, if the UE finds that the cell is not congested (e.g. based on lack of back of indicators) and still RAR fails, it can conclude that it suffers from the propagation distance issue.

In a network based solution, the idea is that the network tunes its parameters (such as preamble format) based on the UE assistant information. The solution is not real time as it takes time before the UE can connect to some cell and report the problem. These mechanisms do not need continuous actions from the network and UE side, but can be considered as a long term solution. This solution may be considered that this is simpler and more cost efficient than the UE based solutions.

One solution would be to use MDT or RACH failure reporting to detect the propagation distance problem. Currently, in RRC, there exist rach-Report and ConnEstFailReport. These reports could be used to find out RRC connection failures or RACH failures, which helps then the operator to locate problems and tune the network parameters correctly.

FIG. 2 illustrates an example RACH report format. FIG. 3 illustrates an example ConnEstFailReport format.

As discussed above, even though there are existing solutions, there is no mechanism to identify that the problem exists. Also the solutions proposed has the limitation that there must be a secondary cell that the UE is able to connect to, either based on an offset or by barring the strongest cell. The UE may also cause significant interference if it does not connect to its strongest serving cell.

SUMMARY

According to some embodiments, a method implemented in a user equipment (UE) for adjusting for propagation delay includes transmitting one or more preamble sequences to a network node. The method further includes recording a response result for each preamble sequence transmitted to the network node. The method further includes analyzing each response result to determine whether a propagation delay condition exists. If the propagation delay condition exists, the method further includes adjusting a timing of a preamble sequence transmission in accordance with a time shift or monitoring for a preamble sequence in accordance with the time shift.

In some embodiments, a method implemented in a base station for adjusting for propagation delay includes receiving a preamble sequence from a user equipment (UE). The method further includes transmitting a preamble reception response including the received preamble sequence. In response to determining that the base station has not received a response to the preamble reception response from the UE, the method also includes transmitting one or more time-shifted versions of the received preamble sequence.

In some embodiments, a method implemented in a base station for adjusting for propagation delay includes receiving a preamble sequence from a user equipment (UE) in a first window. The method further includes receiving the preamble sequence from the user equipment in a second window that is a time shifted version of the first window. The method also includes detecting that a propagation delay condition exists if the preamble sequence in the second window is stronger than the preamble sequence in the first window.

In some embodiments, a method performed in a control node includes transmitting, to a base station, a configuration command instructing the base station to collect statistics related to a propagation delay condition. The method further includes receiving a statistics report from the base station regarding the collected statistics.

According to some embodiments, a user equipment (UE) for adjusting for propagation delay, includes a processor, a memory coupled to the processor, a transceiver coupled to the processor; and an antenna coupled to the transceiver configured to transmit and receive messages. The processor is configured to transmit one or more preamble sequences to a network node, and record a response result for each preamble sequence transmitted to the network node. The processor is further configured to analyze each response result to determine whether a propagation delay condition exists. If the propagation delay condition exists, the process is further configured to adjust a timing of a preamble sequence transmission in accordance with a time shift or monitor for a preamble sequence in a reception window in accordance with the time shift.

According to some embodiments, a base station for adjusting for propagation delay, includes a processor, a memory coupled to the processor, a transceiver coupled to the processor, and an antenna coupled to the transceiver configured to transmit and receive messages. The processor is configured to receive a preamble sequence from a user equipment (UE) and transmit a preamble reception response including the received preamble sequence. In response to determining that the base station has not received a response to the preamble reception response from the UE, the processor is further configured to transmit one or more time-shifted versions of the received preamble sequence.

In some embodiments, a base station for adjusting for propagation delay, includes a processor, a memory coupled to the processor, a transceiver coupled to the processor, and an antenna coupled to the transceiver configured to transmit and receive messages. The processor is configured to receive a preamble sequence from a user equipment (UE) in a first window. The processor is further configured to receive the preamble sequence from the user equipment in a second window that is a time shifted version of the first window. The processor is also configured to detect that a propagation delay condition exists if the preamble sequence in the second window is stronger than the preamble sequence in the first window.

In some embodiments, a control node includes a processor, a memory coupled to the processor, a transceiver coupled to the processor, and an antenna coupled to the transceiver configured to transmit and receive messages. The processor is configured to transmit, to a base station, a configuration command instructing the base station to collect statistics related to a propagation delay condition. The processor is further configured to receive a statistics report from the base station regarding the collected statistics.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIGS. 2 and 3 illustrate example reporting formats.

FIGS. 12-15 are illustrations of exemplary file formats for reporting excessive propagation delay.

DETAILED DESCRIPTION

According to some embodiments, a UE identifies, with some probability, that it is experiencing an excessive propagation delay, resulting in erroneous preamble decoding. In this regard, the UE may detect that the propagation delay is larger than Ncs. Ncs may be defined in accordance with Tables 5.7.2-2 and 5.7.2-3 of 3GPP specification 36.211 for preamble formats 0-3 and 4, respectively. If the UE detects excessive propagation delay, the UE applies a time-shift to the RACH procedure. The time shift may either be applied at PRACH preamble transmission or at RAR reception by monitoring for a preamble index associated with a time-shifted version of the transmitted preamble.

Figure 4:
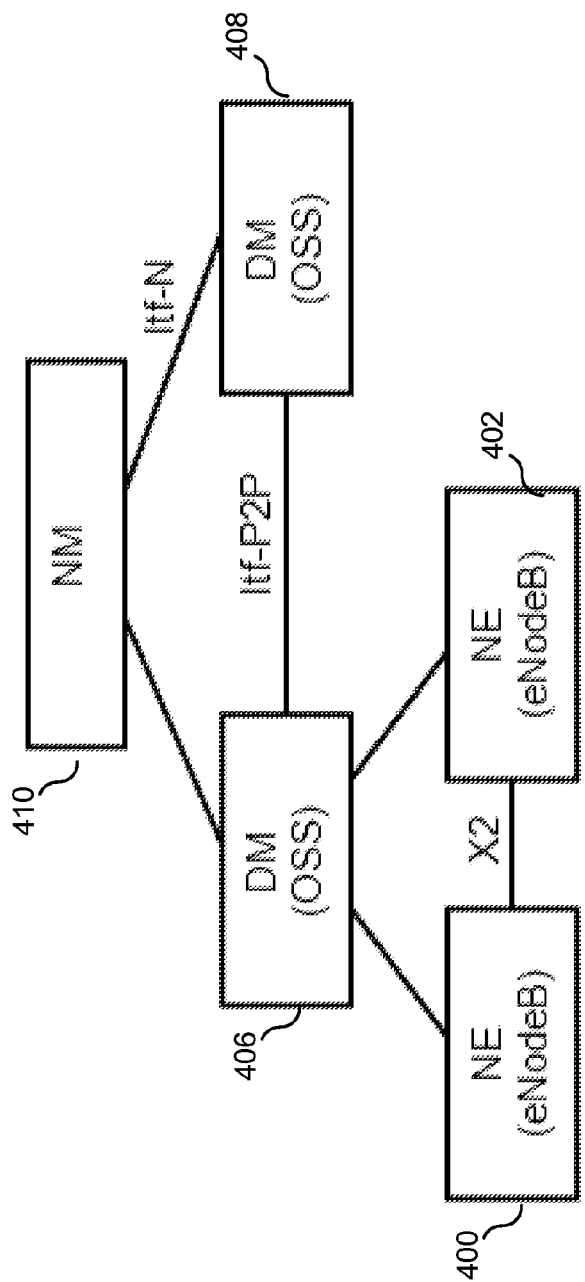
FIG. 4 illustrates an exemplary management system

FIG. 4 illustrates an embodiment of a management system. The node elements (NE) 400 and 402, also referred to as eNodeB, are managed by a domain manager (DM) 406, also referred to as the operation and support system (OSS). The DMs may further be managed by a network manager (NM) 410. The NEs 400 and 402 are interfaced by X2, whereas the interface between DMs 406 and 408 is referred to as Itf-P2P. In some embodiments, network observations end up at a server or database within a DM or NMS.

Figure 5:
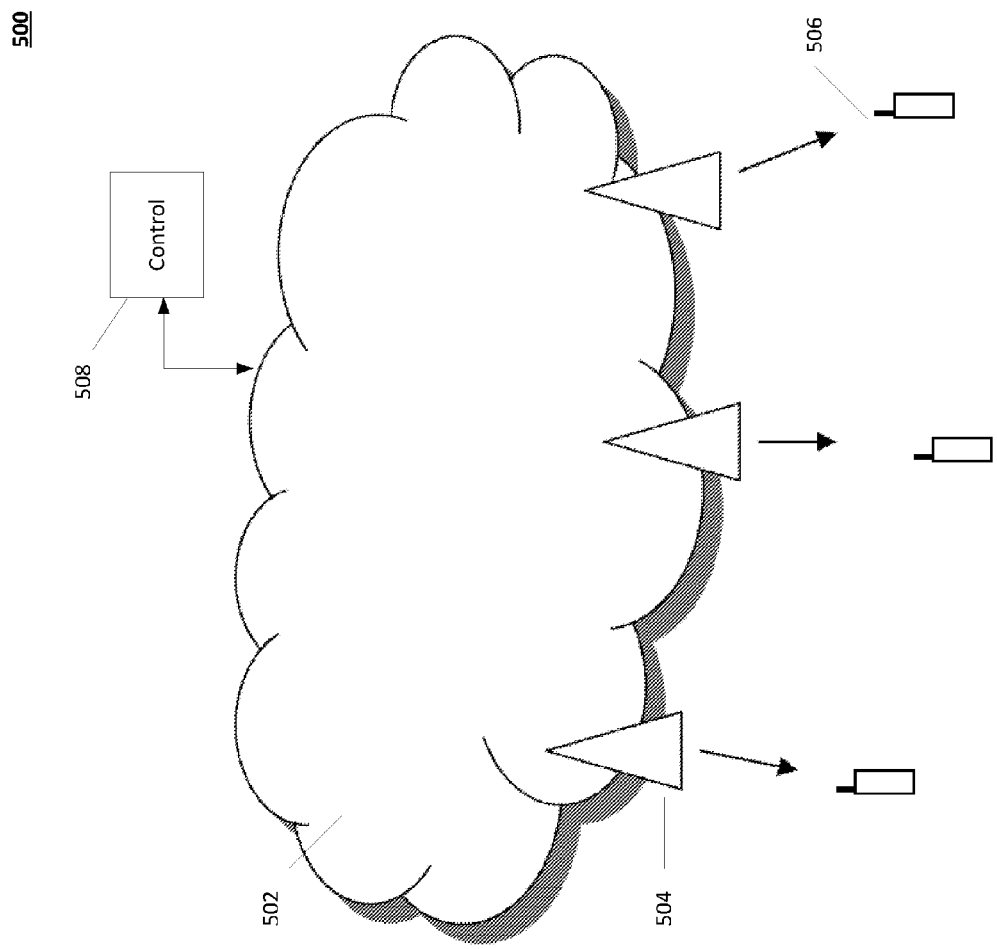
FIG. 5 is an illustration of a wireless communication system in accordance with exemplary embodiments.

Referring to FIG. 5, a wireless communication deployment 500 in accordance with exemplary embodiments includes an access node 504 serving a wireless communication device (WCD) 506. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 506 may be a legacy UE or dynamic TDD capable UE. Access node 504 may be, for example, a base station, an eNodeB, relay node, or gateway type device, and is capable of communicating with device 506, along with any additional elements suitable to support wireless communication between wireless communication devices or between a wireless communication device and another communication device, such as landline telephone. The access node 504 may be in communication with, for instance via a network 502, one or more control nodes 508, such as a Radio Network Controller (RNC), a Mobility Management Entity (MME), a Mobile Switching Center (MSC) or Base Station Subsystem (BSS). Although node 508 is explicitly identified as a control node, each of nodes 504, 506, and 508 may be understood as a "control" node to the extent that it includes a control unit or otherwise implements control functions.

According to some embodiments, detecting excessive propagation delay can be done by determining one or more parameters. This determination may be performed in the UE. The one or more parameters may include a number of random access attempts without a reply for the selected preamble in the RAR ($N_A$). The one or more parameters may include a number of other preambles received in the random access response during RA-Response Windows associated with the random access attempts ($N_O$). The one or more parameters may include a number of occurrences of a random access response including a time shifted preamble compared to the used preamble during RA-Response Windows associated with the random access attempts ($N_T$). The one or more parameters may include a number of back-off indications included in the random access responses during RA-Response Windows associated with the random access attempts ($N_B$). As an example, a random access response is considered to contain a back-off indicator if a Backoff Indicator (BI) field in a MAC header for a Random Access Response (3GPP TS 36.321 6.2.2) indicates a value above a threshold (e.g., BI is non-zero).

In some embodiments, an excessive propagation delay is detected if Na exceeds a pre-configured or configurable threshold. The values for $N_O$, $N_T$, and $N_B$ may be scaled with the parameter $N_A$ (e.g., $N_O$, $N_T$, and $N_B$ are divided by $N_A$). In some embodiments, an excessive propagation delay is detected if $N_T$ exceeds a predetermined or configurable threshold.

According to some embodiments, an excessive propagation delay is detected if $N_T$ exceeds a first predetermined or configurable threshold, $N_B$ does not exceed a second predetermined or configurable threshold, and/or while $N_O$ does not exceed third predetermined or configurable threshold. If the cell is highly loaded, then it is more likely that a different UE has selected the time-shifted preamble. The thresholds may be derived as a combination of predetermined or configurable parameters.

In some embodiments, the UE may perform a hypothesis testing if a specific time shift of its transmitted preamble is actually received in the base station by detecting how frequent that time shift is and the probability of that preamble being used by another user based on the total number of preambles in random access responses in each RA response window. As an example, hypothesis testing can compute the probability of "excessive delay", which can be used to define a threshold.

In an example, the UE sends a RA preamble 5 times without receiving a reply with the correct preamble index (i.e., $N_A$=5). During these 5 attempts, the UE detects 5 preamble indexes which are time shifted from the preamble that the UE transmitted (i.e., $N_T$=5). Furthermore, the UE does not detect any back-off indicators in Random Access Responses (e.g., $N_B$=0). In this situation, the UE may assume that the excessive propagation delay has occurred. That is, the UE may assume that excessive propagation delay has occurred if $N_A$ is greater than a first predetermined threshold, $N_T$ is greater than a second predetermined threshold, and $N_B$ is below a predefined threshold.

In another example, combining $N_A$ and $N_O$, an excessive propagation delay may be detected if $N_A$ exceeds a predetermined or configurable first threshold, while $N_O$ is less than a second threshold. The second threshold may be derived as a combination of a predetermined or configurable parameters and $N_A$ (e.g., using $N_A$ to derive the second threshold).

In another example, excessive propagation delay is detected where $N_A$ exceeds a first predetermined or configurable threshold and $N_O$ exceeds a second predetermined or configurable threshold. In this scenario, the UE is not receiving a response while other UEs receive a response.

In some embodiments, the eNodeB may signal a threshold for the propagation delay detection using system information broadcast. According to some embodiments, a single bit transmitted from the eNodeB indicates if detection excessive propagation delay is allowed or not. In some embodiments, multi-bit indication is used to set a false detection threshold. As an example, a false detection threshold indicates how often the UE detects excessive delay even if it the access problem is related to some other problem. The false detection threshold may be derived from any one of the previously described thresholds.

Figure 6:
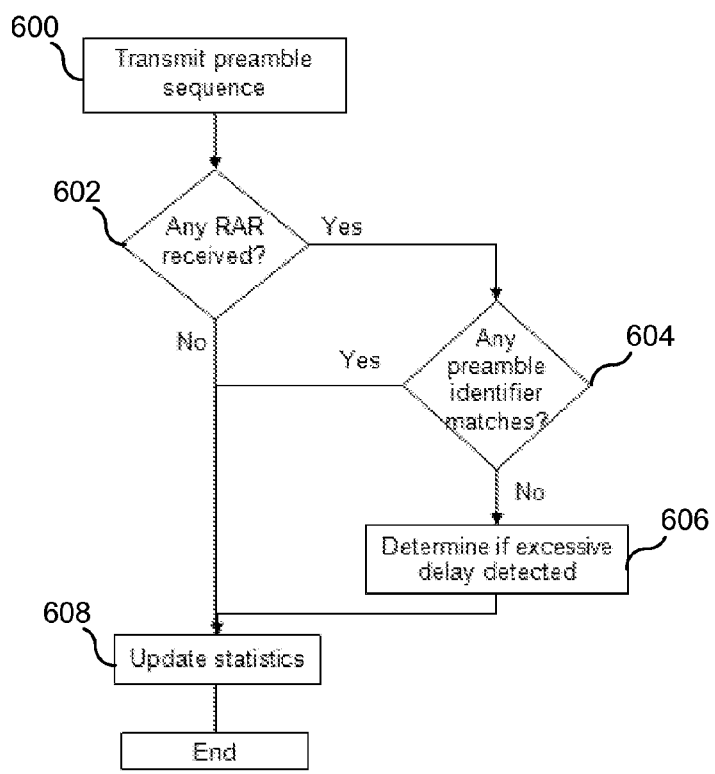
FIG. 6. is an illustration of a process performed at the UE in accordance with some embodiments.

FIG. 6 illustrates an embodiment of a process performed by the UE. The process illustrates in FIG. 6 may start at step 600 where the UE transmits a preamble sequence. In step 602, it is determined if any RAR is received. This response window time may be a predetermined amount of time (e.g., 6 ms). If no RAR is received, the process proceeds to step 608 to update statistics (e.g., $N_A$ is incremented by one). If the RAR is received, the process proceeds to step 604 to determine if any preamble sequence in the RAR matches the transmitted preamble sequence. If the preamble sequence in the RAR matches the transmitted preamble, the process proceeds to step 608 to update statistics. If the preamble in the RAR does not match the transmitted preamble sequence, the process proceeds to step 606 to determine if excessive propagation delay is detected. The process proceeds to step 608 to update statistics. The process illustrated in FIG. 6 may be repeated until it is determined that excessive propagation delay is detected, the UE has successfully performed random access with the network, or random access time out is detected.

Figure 7:
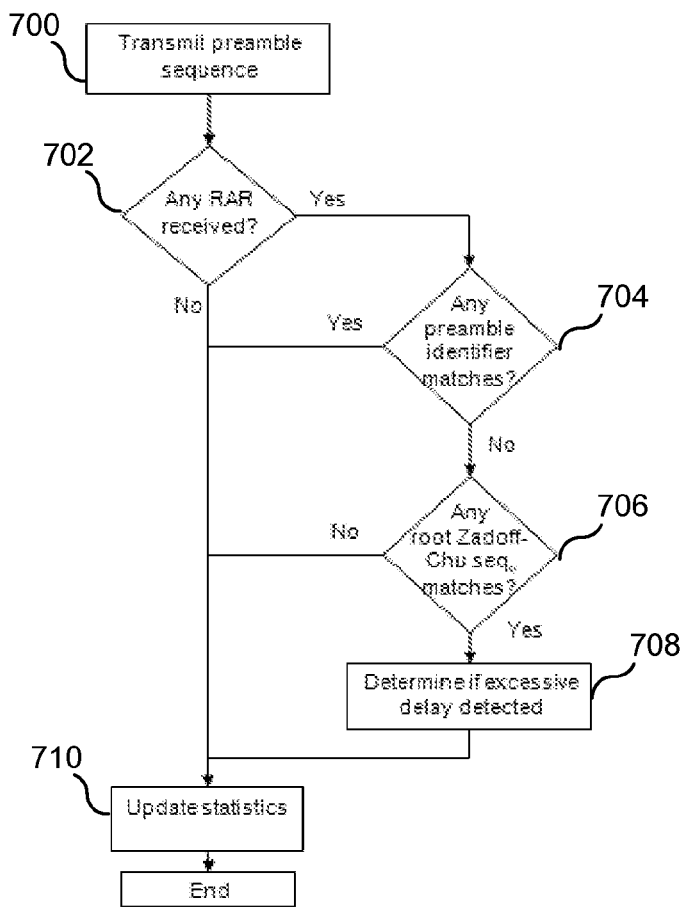
FIG. 7 is an illustration of a process performed at the UE in accordance with some embodiments.

FIG. 7 illustrates an embodiment of a process performed by the UE. The process illustrates in FIG. 7 may start at step 700 where the UE transmits a preamble sequence. In step 702, it is determined if any RAR is received. This response window time may be a predetermined amount of time (e.g., 6 ms). If no RAR is received, the process proceeds to step 710 to update statistics (e.g., $N_A$ is incremented by one). If the RAR is received, the process proceeds to step 704 to determine if any preamble sequence in the RAR matches the transmitted preamble sequence. If the preamble sequence in the RAR matches the transmitted preamble, the process proceeds to step 710 to update statistics. If the preamble in the RAR does not match the transmitted preamble sequence, the process proceeds to step 706 to determine if the preamble in the RAR matches a root Zadoff Chu sequence sent by the UE. If there is no match in step 706, the process proceeds to step 710 to update statistics. However, if there is a match, the process proceeds to step 708 to determine if excessive propagation delay is detected. The process proceeds to step 710 to update statistics. The process illustrated in FIG. 7 may be repeated until it is determined that excessive propagation delay is detected, the UE has successfully performed random access with the network, or random access time is detected.

According to some embodiments, a UE may determine from the previous random access attempts a preamble shift, that with high probability, is associated with the user. As an example, preambles may be generated from one or multiple root sequences, where a time-shifted version of a preamble sequence has the same root sequence. This determination may be done by observing a random access response including a preamble corresponding to a specific time shift T of the transmitted preamble in a large number of the previous access attempts. This can be seen in FIG. 1, where the round-trip time is related to the expected correlation peak. However, if the round-trip time is much longer than expected, the correlation peak will instead be associated to a different preamble. A shift in time T1 corresponding to one shift $N_{CS}$ of the preamble sequence leads to a corresponding shift of $s(T_1)=1$ in a preamble index. For example, this is determined if the UE has transmitted a preamble with index X, and the time-shift T corresponds to a shift s(T) in preamble index to a different preamble index Xmod=X−s (T), and the shifted preamble Xmod is observed a number of times. In some embodiments, this is determined already when observed once (e.g., $N_T$>0). In some examples, the function may depend on the $N_{CS}$ applicable for the cell (i.e., Ncs gives the time difference/shift between two preambles of the same root sequence).

In this embodiment, the UE may send a preamble according to legacy behavior, but if a random access response is received including a preamble Xmod corresponding to the observed time shift T, this response is considered as a valid preamble index and the UE considers Random Access Response reception successful. As an example of legacy behavior, the UE monitors for Xmod in the RAR instead of X. Then the UE proceeds with the Random Access procedure and considers the uplink grant and the timing advance information included in the RA response as valid for itself.

Figure 1:
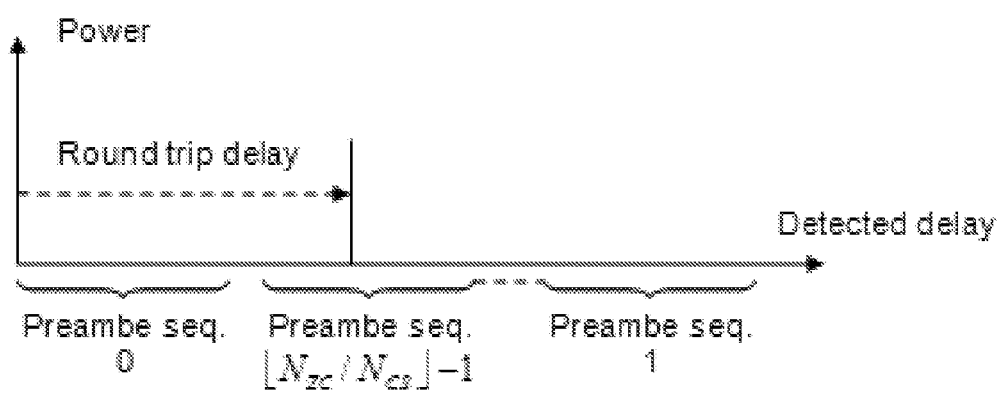
FIG. 1 illustrates an example preamble sequence allocation.

According to some embodiments, the UE may apply an additional increment to the timing advance included in the RA response to determine a modified timing advance. The additional increment may be a function of the observed time-shift T. For example, the increment may be equal to T. In another mode, the increment may be equal to 2T since the timing advance can be seen as a round-trip time estimate. The modified time alignment is considered by the UE when utilizing the uplink grant that was included in the RA response. This embodiment is illustrated in FIG. 1.

Figure 8:
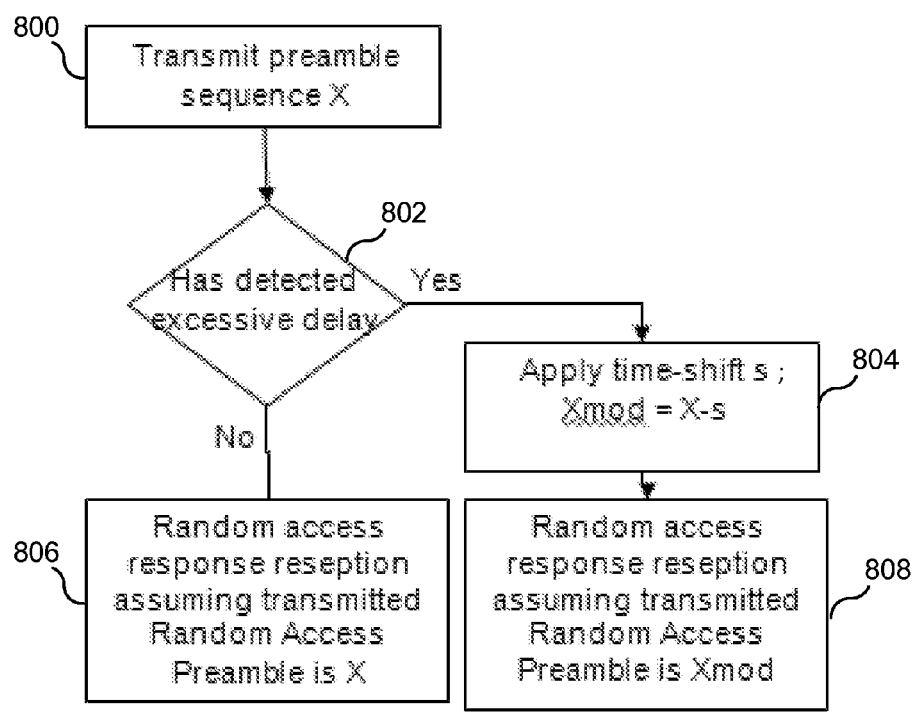
FIG. 8 is an illustration of a process performed at the UE in accordance with some embodiments.
Figure 9:
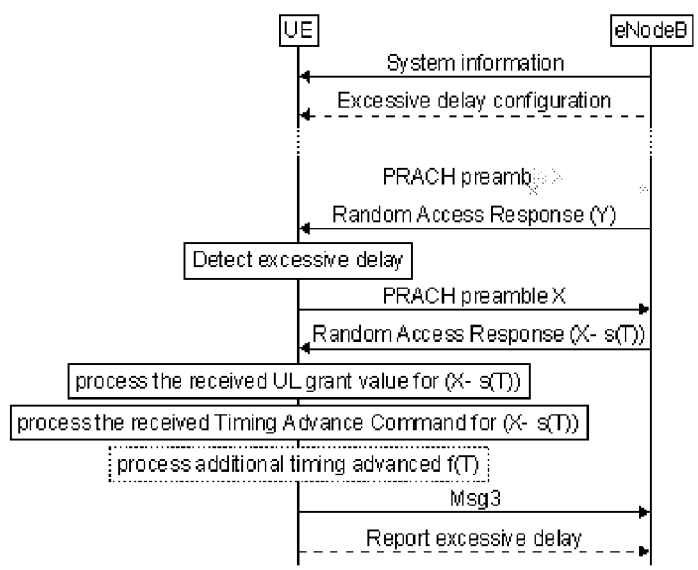
FIG. 9 is an illustration of an exemplary sequence diagram in accordance with some embodiments.

FIG. 8 illustrates an embodiment of a process performed at the UE. The process may start at step 800 where the UE transmits a preamble sequence X to a network node (e.g., base station). The process proceeds to step 802 to determine if excessive delay is detected in accordance with any of the previously described embodiments. If no excessive propagation delay is detected, the process proceeds to step 806 where random access response reception is performed assuming random access preamble is X. If excessive propagation delay is detected, the process proceeds to step 804 to apply a time-shift Xmod=X-s. In step 808, random access response reception is performed assuming that the transmitted random access preamble is Xmod instead of X. FIG. 9 illustrates an exemplary sequence diagram between the UE and eNodeB, where the RA response window is adjusted for a time-shifted preamble.

According to some embodiments, the UE may apply a time-shift at preamble transmission where the transmission is initiated Δ*Ts seconds earlier than when an un-shifted transmission would be started. In some embodiments, Δ*Ts is associated with the observed time-shift T. According to some embodiments, Δ may be dependent on the transmission attempt number such that for each transmission attempt, after detecting excessive propagation delay, the time shift increases (e.g., Δ=j*δ, where Δ is the actual time-shift, j is the transmission attempt number, and δ is a fixed step). In some embodiments, Δ may be dependent on the $N_{CS}$ applicable for the cell to which the UE is attempting random access. Also, an additional increment to the timing advance included in the RA response may be considered to determine a modified timing advance. The additional increment to the timing advance may be proportional to the Δ used in the preamble transmission for which a RA response is received. In some embodiments, a time offset, δ, is signaled from the network in system broadcast.

Figure 10:
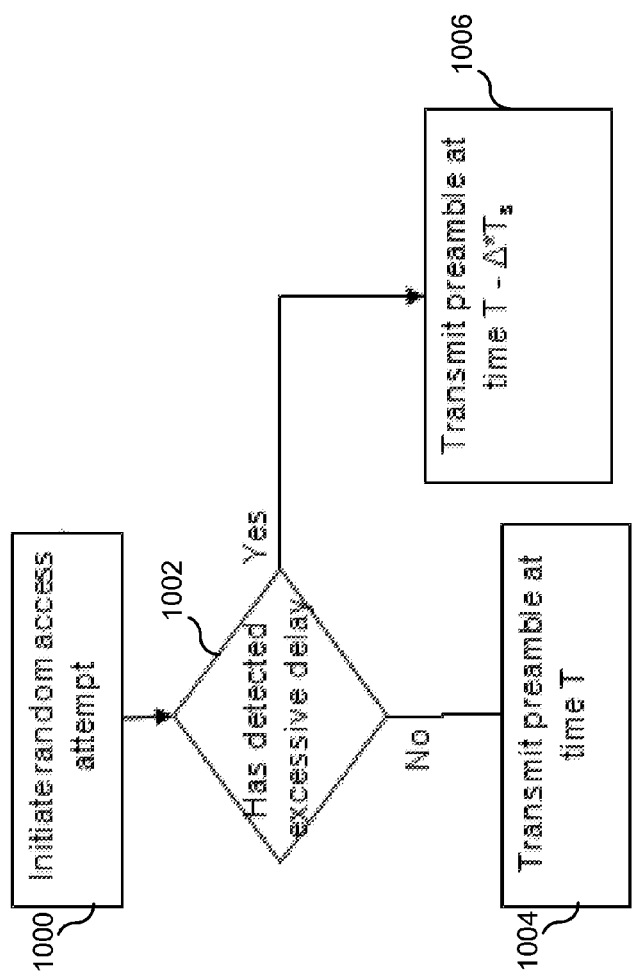
FIG. 10 is an illustration of a process performed at the UE in accordance with some embodiments.
Figure 11:
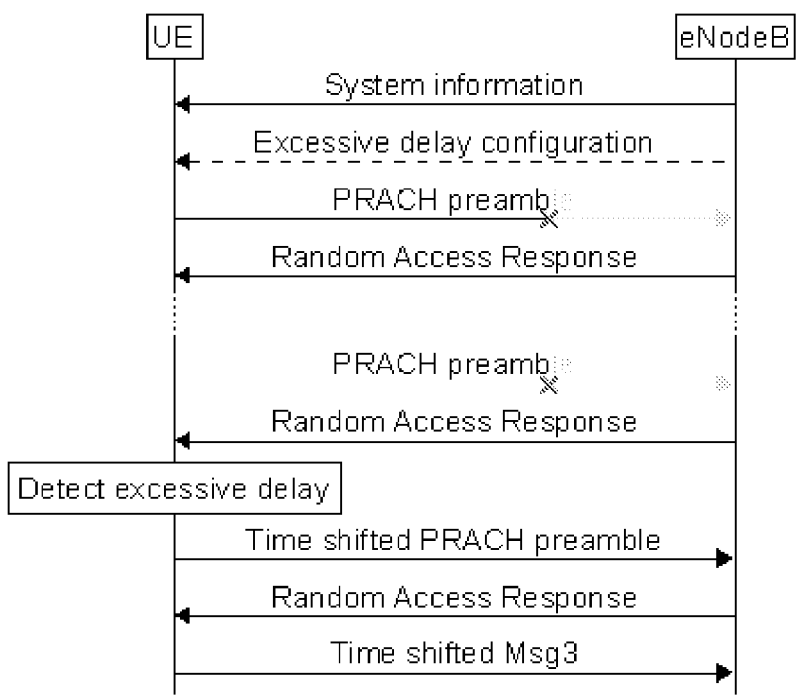
FIG. 11 is an illustration of an exemplary sequence diagram in accordance with some embodiments.

FIG. 10 illustrates an embodiment of a process performed by the UE. The process may start at step 1000 where the UE initiates random access attempt. In step 1002, the UE determines where excessive propagation delay is detected in accordance with the previously described embodiments. If no excessive propagation delay is detected, the process proceeds to step 1004 where the UE transmits a preamble at time T. If excess propagation delay is detected, the process proceeds to step 1006 where the UE transmits the preamble at time T−Δ*Ts. FIG. 11 illustrates an exemplary sequence diagram between the UE and eNodeB, where the transmission time of the preamble sequence is shifted if excessive propagation delay is detected.

According to some embodiments, the detection instead is done in the eNodeB. The eNodeB could perform this detection, for example, by detecting a number of sequential access attempts where no random access response is received even if the detection of the random access preamble is strong. When this is detected in the eNodeB, it may for a period of time send random access responses not only to detected preambles, but also to other preambles using one or a few time shifts of the detected preambles root sequence. (e.g., the eNode may detect a preamble with a specific root sequence and also send a random access response for a second preamble that is generated from the same root sequence). The second preamble may be the preamble related to the closest time-shifted version of the detected preamble allowed to be selected in the cell.

In some embodiments, the detection of excessive propagation delay by the eNodeB may also consider different time-windows for the correlation where a separate detection of random access preambles are attempted at a later time, where this later time may be partially outside of the expected cyclic prefix for preambles transmitted in the cell. Preambles detected to be stronger in the time shifted version of the correlation window may be expected to be transmitted with excessive propagation delay. As an example, if a correlation between a first preamble and a known preamble is larger than a correlation between a second preamble and the known preamble, the first preamble is a stronger preamble than the second preamble. If excessive propagation delay is detected, the eNodeB may decide to send a random access response to only the time-shifted preamble index or to both the detected preamble in the original window and the time-shifted preamble.

According to some embodiments, when the UE successfully has established a connection to the base station, the UE may report information about the detected excessive propagation delay. The information may be only an indication, or may contain enriched information such as the observed time-shift in time T, the observed time-shift in preamble index s(T), and/or the considered time alignment increment. In some embodiments, the indication is sent as an indicator as part of the connection establishment, for example, in Msg3, or Msg5. In some embodiments, the indicator is sent as a dedicated value as part of the connection establishment in RRCConnectionRequest. The indication may also be sent as a MAC CE in the next possible UL resource such as in Msg3 or in Msg5.

The connection establishment procedure may also include an indication that there is enriched information available in a report. The base station can retrieve such a report via a request message such as a UE information request message. The UE can provide the requested report via a response message such as a UE information response message. In one embodiment, the enriched report is implemented as additions to the rach-Report as illustrated in FIGS. 12-15.

According to some embodiments, the base station may be configured to aggregate statistics over either indications and reports from connecting UEs regarding the occurrence of excessive propagation delays, or indications determined in the base station. The statistics may be aggregated over time periods and may be reported regularly to a network management node, on demand, or when a pre-configured or configurable criterion is met. The latter can also be considered as an alarm. One example criterion is that the number of indications over a time period have exceeded a threshold.

Figure 16:
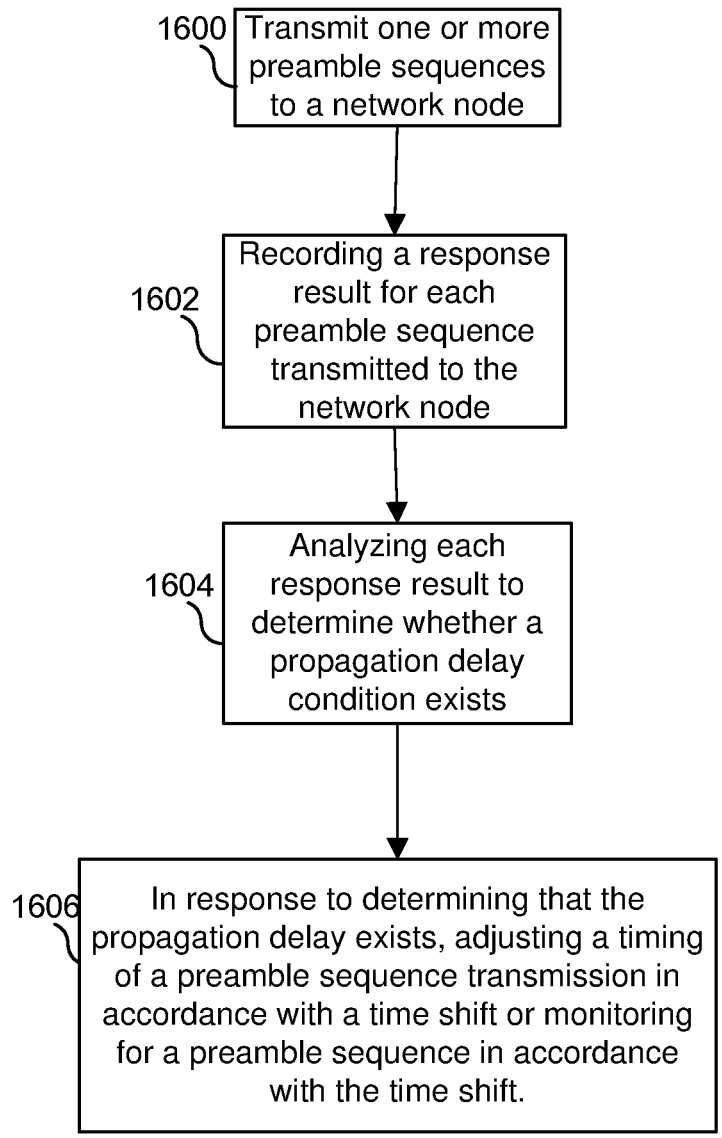
FIG. 16 is a flow chart of an exemplary process performed in in the UE.

FIG. 16 is a flow chart illustrating an embodiment of a process performed in the UE (e.g., UE 506 in FIG. 5) for adjusting for propagation delay. The process may start at step 1600 where the UE transmits one or more preamble sequences to a network node (e.g., node 504 in FIG. 5). In step 1602, the UE records a response result for each preamble sequence transmitted to the network node. In step 1604, the UE analyzes each response result to determine whether a propagation delay condition exists. In step 1606, in response to determining that the propagation delay condition exists, the UE adjusts a timing of a preamble sequence transmission in accordance with a time shift or monitoring for a preamble sequence in accordance with the time shift.

According to some embodiments, the analyzing step determines from one or more response results (i) a number of times no reply is received from the network node in response to the transmitting the preamble sequence to the network node ($N_A$), and (ii) a number of times a preamble sequence received from the network node is a time shifted preamble sequence ($N_T$). In some embodiments, the propagation delay condition exists if at least $N_A$ is greater than a predetermined threshold. In some embodiments, the propagation delay condition exists if at least $N_T$ is greater than a predetermined threshold. In some embodiments, the propagation delay condition exists if at least $N_A$ is greater than a first predetermined threshold and $N_T$ is greater than a second predetermined threshold.

According to some embodiments, the time shift is determined using at least a time-shifted version of a preamble sequence transmitted to the network node. In some embodiments, the adjusting step includes adjusting the timing of transmitting the preamble sequence to the network node by an amount corresponding to the time shift. In some embodiments, the monitoring step monitors for reception of, in accordance with the time shift, a time-shifted version of a preamble sequence transmitted to the network node. In some embodiments, in response to determining that the propagation delay condition exists, the UE transmits a file indicating the propagation delay condition to the network node.

Figure 17:
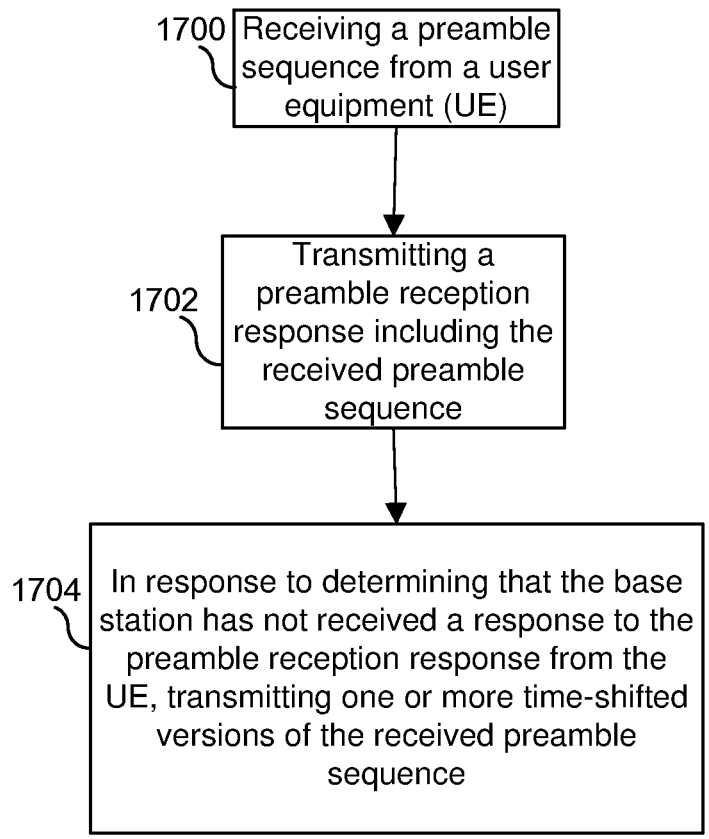
FIG. 17 is a flow chart of an exemplary process performed in the base station.

FIG. 17 illustrates a flow chart of an embodiment of a process performed in a base station (e.g., node 504 in FIG. 5) for adjusting for propagation delay. The process may start at step 1700 where the base station receives a preamble sequence from a user equipment (UE). In step 1702, the base station transmits a preamble reception response including the received preamble sequence. In step 1704, in response to determining that the base station has not received a response to the preamble reception response from the UE, the base station transmits one or more time-shifted versions of the received preamble sequence.

According to some embodiments, the base station further transmits the one or more time-shifted versions of the received preamble sequence is further in response to determining that: (i) the base station has received the preamble sequence a plurality of times within a predetermined time period, (ii) the base station has transmitted the preamble reception response for each time the preamble sequence is received, and (iii) a number of times that the base station has not received a response to the preamble reception response exceeds a predetermined threshold.

In some embodiments, the base station determines a propagation delay condition exists if a number of times the UE does not transmit a response to the preamble reception response exceeds a predetermined threshold. In some embodiments, in response to determining that the propagation delay condition exists, the base station transmits another preamble reception response including another preamble sequence generated from a same root sequence as the received preamble sequence. In some embodiments, the another preamble sequence is a time shifted version of the received preamble sequence.

Figure 18:
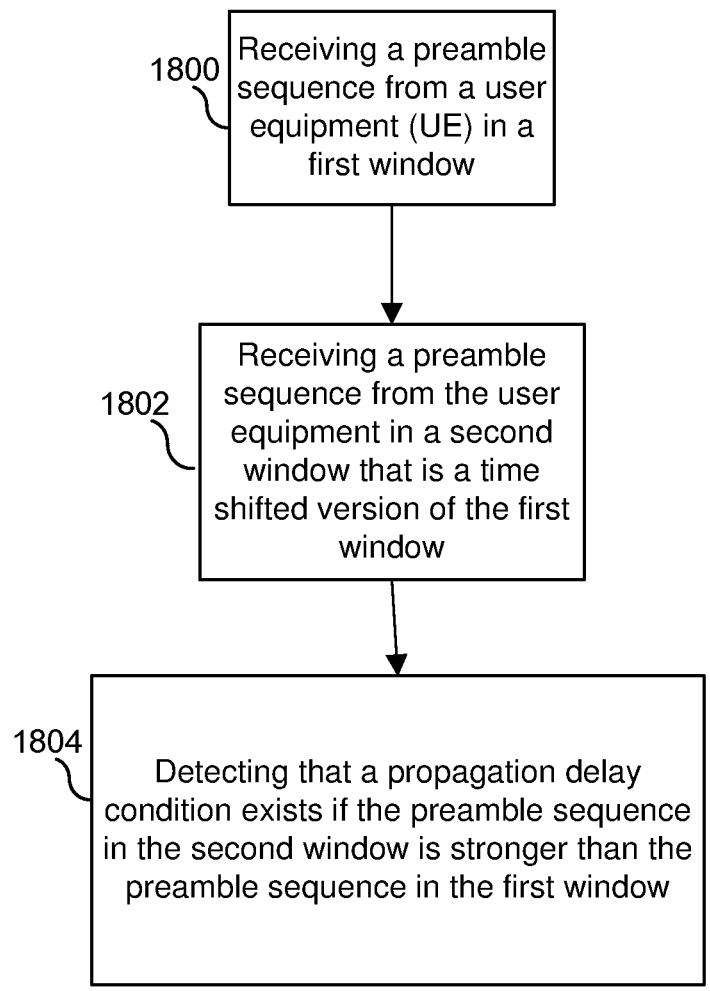
FIG. 18 is a flow chart of an exemplary process performed in the base station.

FIG. 18 illustrates a flow chart of an embodiment of another process performed in the base station (e.g., node 504 in FIG. 5) for adjusting for propagation delay. The process may start at step 1800 where the base station receives a preamble sequence from a user equipment (UE) in a first window. In step 1802, the base station receives the preamble sequence from the user equipment in a second window that is a time shifted version of the first window. In step 1804, the base station detects that a propagation delay condition exists if the preamble sequence in the second window is stronger than the preamble sequence in the first window.

According to some embodiments, in response to determining that the propagation delay condition exists, the base station transmits a preamble reception response to the preamble sequence received in the second window. In some embodiments, the base station transmits a preamble reception response to the preamble sequence received in the second window in response to determining that a number of times the propagation delay condition is detected within a predetermined time period exceeds a predetermined threshold.

According to some embodiments, in response to determining that the propagation delay condition exists, the base station transmits another preamble reception response to the preamble sequenced received in the first window. In some embodiments, the base station transmits another preamble reception response to the preamble sequenced received in the first window in response to determining that a number of times the propagation delay condition is detected within a predetermined time period exceeds a predetermined threshold.

Figure 19:
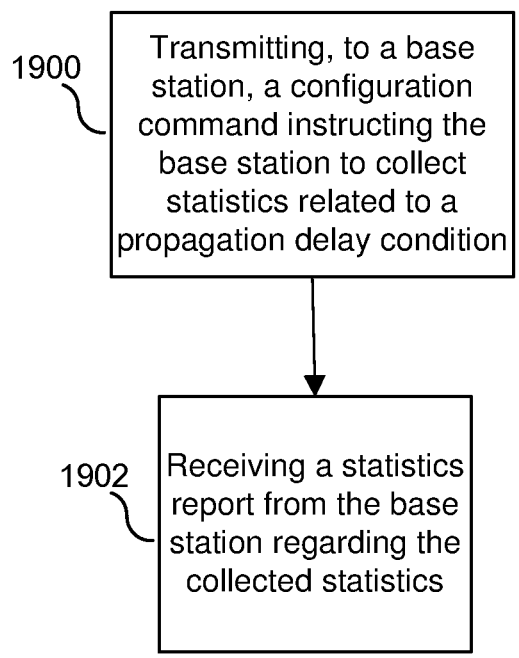
FIG. 19 is a flow chart of an exemplary process performed in the control node.

FIG. 19 illustrates an embodiment of a process performed in a control node (e.g., control node 508 in FIG. 5). The process may start at step 1900, where the control node transmits, to a base station (e.g., base station 504), a configuration command instructing the base station to collect statistics related to a propagation delay condition. In step 1902, the control node receives a statistics report from the base station regarding the collected statistics.

According to some embodiments, the collected statistics is an aggregate of statistical information determined in the base station or reports from a user equipment (UE) in communication with the base station. In some embodiments, the configuration command (i) specifies a predetermined schedule for sending the statistics report to the base station or (ii) specifies that the base station transmits the statistics report to the control node to the base station in response to determining that a number of times the propagation delay condition exists exceeds a predetermined threshold.

According to some embodiments, the configuration command specifies a predetermined time period for collecting the statistics related to the propagation delay. In some embodiments, the configuration command specifies one or more conditions for supporting the propagation delay. In some embodiments, the one or more conditions specify (i) a time period, (ii) whether a traffic load is below a predetermined threshold, and (iii) whether a random access load is below a predetermined threshold.

Figure 20:
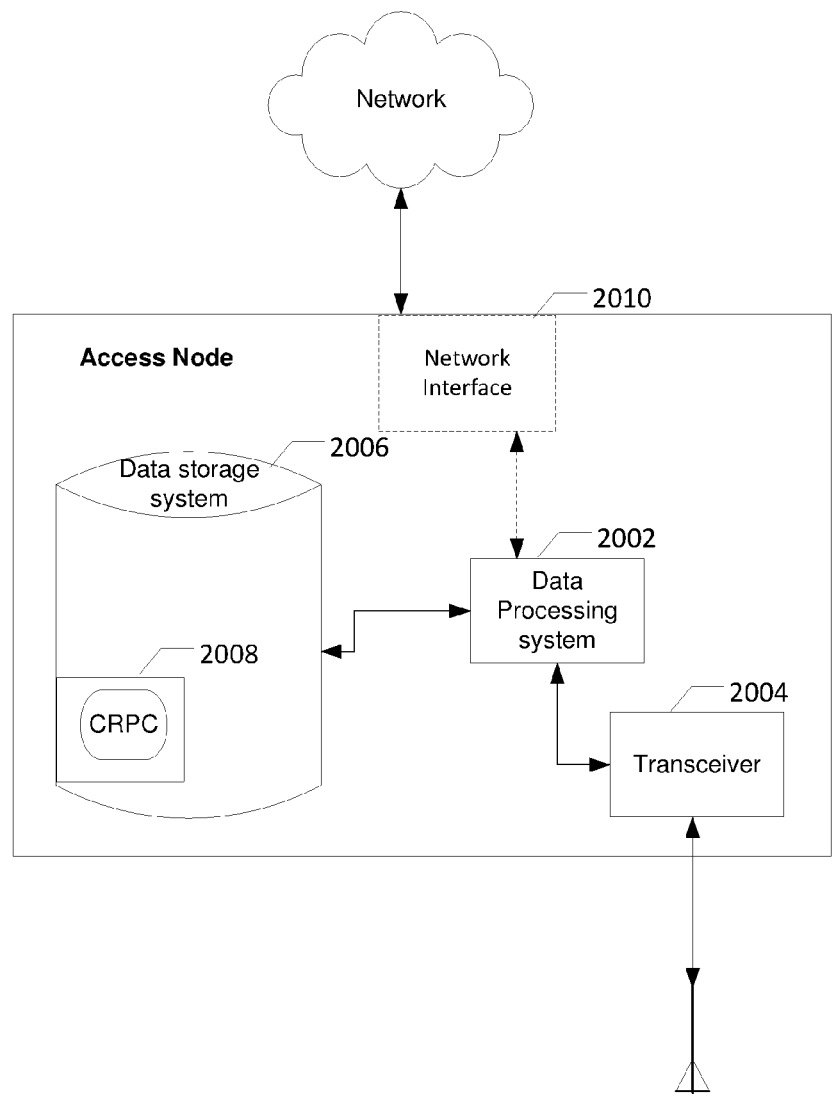
FIG. 20 is an exemplary illustration of an access node.

FIG. 20 illustrates a block diagram of an exemplary access node, such as node 504 shown in FIG. 5. As shown in FIG. 20, the access node 504 may include: a data processing system 2002, which may include one or more microprocessors and/or one or more circuits, such as an application specific integrated circuit (ASIC), field-programmable gate arrays (FPGAs), and the like; a network interface 2010; a transceiver 2004, and a data storage system 2006, which may include one or more non-volatile storage devices and/or one or more volatile storage devices (e.g., random access memory (RAM)). According to some embodiments, the data processing system 2002 may comprise a control unit used for selection of transmission parameters.

In embodiments where data processing system 2002 includes a microprocessor, computer readable program code (CRPC) 2008 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 2002 to perform processes for the access node 504 such as the processes illustrated in FIGS. 17 and 18. In other embodiments, the access node 504 is configured to perform steps described herein without the need for code. That is, for example, data processing system 2002 may consist merely of one or more ASICs. Hence, the features of the embodiments described herein may be implemented in hardware and/or software. For example, in particular embodiments, the functional components of the base station described above may be implemented by data processing system 2002 executing computer instructions, by data processing system 2002 operating independent of any computer instructions, or by any suitable combination of hardware and/or software.

Figure 21:
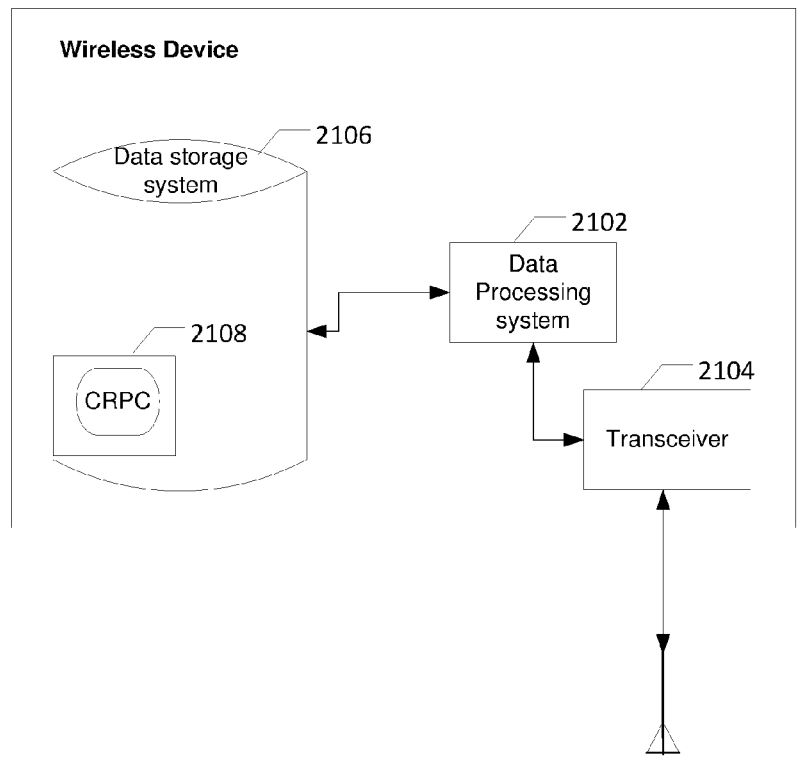
FIG. 21 is an exemplary illustration of a wireless device.

FIG. 21 illustrates a block diagram of an exemplary wireless device, such as device 506 shown in FIG. 5. As shown in FIG. 21, the device 506 may include: a data processing system 2102, which may include one or more microprocessors and/or one or more circuits, such as an application specific integrated circuit (ASIC), field-programmable gate arrays (FPGAs), and the like; a transceiver 2104, and a data storage system 2106, which may include one or more non-volatile storage devices and/or one or more volatile storage devices (e.g., random access memory (RAM)). According to some embodiments, the data processing system 2102 may comprise a control unit used for selection of transmission parameters.

In some embodiments, where data processing system 2102 includes a microprocessor, computer readable program code (CRPC) 2108 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 2102 to perform steps described above (e.g., steps described above with reference to the flow charts shown in FIGS. 5-8, 10, and 16). In other embodiments, the device 506 is configured to perform steps described herein without the need for code. That is, for example, data processing system 2102 may consist merely of one or more ASICs. Hence, the features of the embodiments described herein may be implemented in hardware and/or software. For example, in particular embodiments, the functional components of the base station described above may be implemented by data processing system 2102 executing computer instructions, by data processing system 2102 operating independent of any computer instructions, or by any suitable combination of hardware and/or software.

Figure 22:
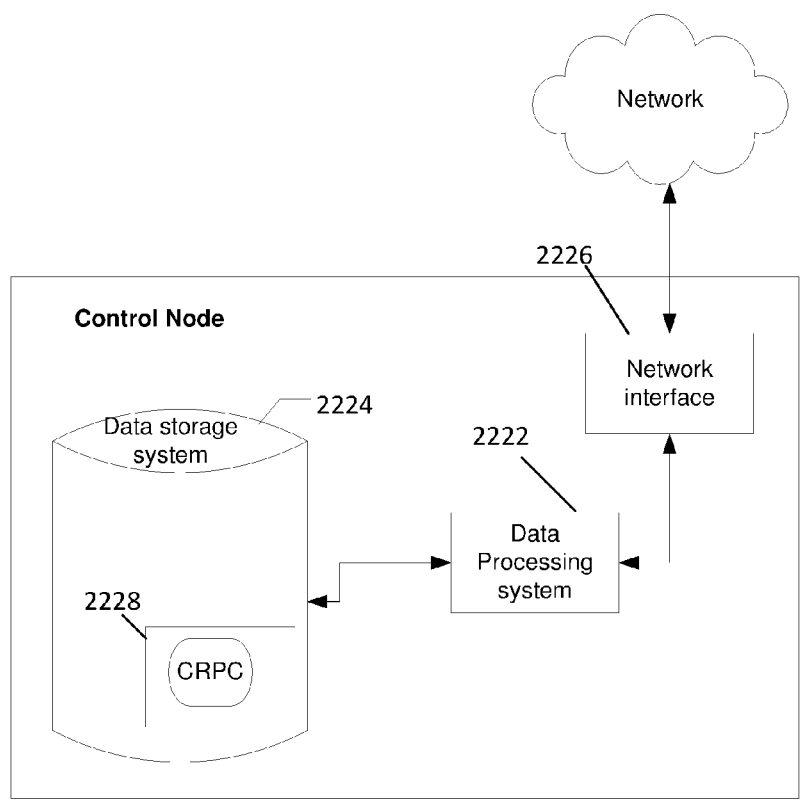
FIG. 22 is an exemplary illustration of a control node.

FIG. 22 illustrates a block diagram of an exemplary control node, such as node 508 shown in FIG. 5. As shown in FIG. 22, the control node 508 may include: a data processing system 2202, which may include one or more microprocessors and/or one or more circuits, such as an application specific integrated circuit (ASIC), field-programmable gate arrays (FPGAs), and the like; a network interface 2206, and a data storage system 2204, which may include one or more non-volatile storage devices and/or one or more volatile storage devices (e.g., random access memory (RAM)). According to some embodiments, the data processing system 2202 may comprise a control unit used for selection of transmission parameters.

In some embodiments, where data processing system 2202 includes a microprocessor, computer readable program code (CRPC) 2208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 2202 to perform processes for the control node 508 such as the process illustrated in FIG. 19. In other embodiments, the control node 508 is configured to perform steps described herein without the need for code. That is, for example, data processing system 2202 may consist merely of one or more ASICs. Hence, the features of the embodiments described herein may be implemented in hardware and/or software. For example, in particular embodiments, the functional components of the base station described above may be implemented by data processing system 2202 executing computer instructions, by data processing system 2202 operating independent of any computer instructions, or by any suitable combination of hardware and/or software.

According to the embodiments described herein, it is possible for a UE to access a cell even if the propagation delay is larger than what the preamble configuration in that cell supports. The UE may then also notify the cell about the issue of excessive propagation delay.

Abbreviations

3GPP Third Generation Partnership Project
ANDSF Access Network Discovery and Selection Function
AP Access Point
APN Access Point Name
DL Down Link
eNB eNodeB
EPC Evolved Packet Core
EPS Evolved Packet System
ETWS Earthquake and Tsunami Warning System
E-UTRAN Evolved Universal Terrestrial Radio Access Network
GTP GPRS Tunneling Protocol
GW Gateway
LTE Long Term Evolution
MDT Minimization of Drive Tests
MME Mobile Management Entity
PDN Packet Data Network
PRACH Physical Random Access CHannel
PWS Public Warning System
QoS Quality of Service
RA-RNTI Radio Network Temporary Identifier (RA-RNTI)
RACH Random Access CHannel
RAN Radio Access Network
RAR Random Access Response
RCPI Received Channel Power Indicator
RNC Radio Network Controller
RNTI Radio Network Temporary Identifier
RRC Radio Resource Control
RSRP Reference Signal Received Power
RSSI Received Signal Strength Indicator
TDD Time Division Duplex
UE User Equipment
UL Up Link
WLAN Wireless Local Area Network Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method implemented in a user equipment (UE) for adjusting for propagation delay, the method comprising:
   transmitting one or more preamble sequences to a network node;
   recording one or more response results for each preamble sequence transmitted to the network node;
   analyzing each response result to determine whether a propagation delay condition exists, wherein analyzing each response result includes determining from one or more response results (i) a number of times no reply is received from the network node in response to transmitting the one or more preamble sequences to the network node ($N_A$), and (ii) a number of times a preamble sequence received from the network node is a time shifted preamble sequence ($N_T$); and
   in response to determining that the propagation delay condition exists adjusting a timing of a preamble sequence transmission in accordance with a time shift or monitoring for the preamble sequence in accordance with the time shift.

2. The method according to claim 1, wherein the propagation delay condition exists if at least $N_A$ is greater than a predetermined threshold.

3. The method according to claim 1, wherein the propagation delay condition exists if at least $N_T$ is greater than a predetermined threshold.

4. The method according to claim 1, wherein the propagation delay condition exists if at least $N_A$ is greater than a first predetermined threshold and $N_T$ is greater than a second predetermined threshold.

5. The method according to claim 1, wherein the time shift is determined using at least a time-shifted version of a preamble sequence transmitted to the network node.

6. The method according to claim 1, further comprising: detecting excessive propagation delay exists if $N_A$ is greater than a first predetermined threshold, $N_T$ or $N_o$ is greater than a second predetermined threshold, No is less than a second threshold, and $N_B$ is below a predefined threshold.

7. The method according to claim 6, wherein in response to detecting the excessive propagation delay exists the UE receives no response from the network node.

8. The method according to claim 1, further comprising:
   in response to determining that the propagation delay condition exists, transmitting a file indicating the propagation delay condition to the network node.

9. A user equipment (UE) for adjusting for propagation delay, the UE comprising:
a processor;
a memory coupled to the processor;
a transceiver coupled to the processor; and
an antenna coupled to the transceiver configured to transmit and receive messages,
wherein the processor is configured to:
transmit one or more preamble sequences to a network node,
record a response result for each preamble sequence transmitted to the network node,
analyze each response result to determine whether a propagation delay condition exists, wherein analyze each response result includes determining from one or more response results (i) a number of times no reply is received from the network node in response to the transmit of the one or more preamble sequences to the network node ($N_A$), and (ii) a number of times a preamble sequence received from the network node is a time shifted preamble sequence ($N_T$), and
if the propagation delay condition exists, adjust a timing of a preamble sequence transmission in accordance with a time shift or monitor for a preamble sequence in a reception window in accordance with the time shift.

10. The UE according to claim 9, wherein the propagation delay condition exists if at least $N_A$ is greater than a predetermined threshold.

11. The UE according to claim 9, wherein the propagation delay condition exists if at least $N_T$ is greater than a predetermined threshold.

12. The UE according to claim 9, wherein the propagation delay condition exists if at least $N_A$ is greater than a first predetermined threshold and $N_T$ is greater than a second predetermined threshold.

13. The UE according to claim 9, wherein the time shift is determined using at least a time-shifted version of a preamble sequence transmitted to the network node.

14. The UE according to claim 9, wherein the processor is further configured to detect excessive propagation delay exists if $N_A$ is greater than a first predetermined threshold, $N_T$ or $N_o$ is greater than a second predetermined threshold, $N_O$ is less than a second threshold and $N_B$ is below a predefined threshold.

15. The UE according to claim 14, wherein in response to detecting the excessive propagation delay exists the UE receives no response from the network node.

16. The UE according to claim 9, wherein if the propagation delay condition exists, the processor is further configured to transmit a file indicating the propagation delay condition to the network node.

17. A method implemented in a base station for adjusting for propagation delay, the method comprising:
receiving a preamble sequence from a user equipment (UE);
transmitting a preamble reception response including the received preamble sequence to the UE; and
in response to determining that the base station has not received a response to the preamble reception response from the UE, transmitting one or more time-shifted versions of the received preamble sequence, wherein transmitting the one or more time-shifted versions of the received preamble sequence is further performed in response to determining that (i) the base station has received the preamble sequence a plurality of times within a predetermined time period, (ii) the base station has transmitted the preamble reception response for each time the preamble sequence is received, and (iii) a number of times that the base station has not received a response to the preamble reception response exceeds a predetermined threshold.

18. The method according to claim 17, wherein the base station determines a propagation delay condition exists if a number of times the UE does not transmit a response to the preamble reception response exceeds a predetermined threshold.

19. The method according to claim 18, wherein in response to determining that the propagation delay condition exists, transmitting another preamble reception response including another preamble sequence generated from a same root sequence as the received preamble sequence.

20. The method according to claim 19, wherein the another preamble sequence is a time shifted version of the received preamble sequence.

21. A base station for adjusting for propagation delay, the base station comprising:
a processor;
a memory coupled to the processor;
a transceiver coupled to the processor; and
an antenna coupled to the transceiver configured to transmit and receive messages,
wherein the processor is configured to:
receive a preamble sequence from a user equipment (UE),
transmit a preamble reception response including the received preamble sequence to the UE, and
in response to determining that the base station has not received a response to the preamble reception response from the UE, transmit one or more time-shifted versions of the received preamble sequence, wherein transmitting the one or more time-shifted versions of the received preamble sequence is further performed in response to determining that (i) the base station has received the preamble sequence a plurality of times within a predetermined time period, (ii) the base station has transmitted the preamble reception response for each time the preamble sequence is received, and (iii) a number of times that the base station has not received a response to the preamble reception response exceeds a predetermined threshold.

22. The base station according to claim 21, wherein the processor is further configured to determine that a propagation delay condition exists if a number of times the UE does not transmit a response to the preamble reception response exceeds a predetermined threshold.

23. The base station according to claim 22, wherein in response to determining that the propagation delay condition exists, the processor is further configured to transmit another preamble reception response including another preamble sequence generated from a same root sequence as the received preamble sequence.

24. The base station according to claim 23, wherein the another preamble sequence is a time shifted version of the received preamble sequence.

* * * * *